Patented May 7, 1935

2,000,887

UNITED STATES PATENT OFFICE 2,000,887

VISCOSE SOLUTION

Richard Elssner, Elizabethton, Tenn., assignor to North American Rayon Corporation, a corporation of New York No Drawing. Application July 7, 1933, Serial No. 679,399

4 Claims. (Cl. 106—40)

This application is a continuation-in-part of my copending application, Serial Number 552,192, filed July 21, 1931, Patent No. 1,937,110, Nov. 28, 1933.

My present invention has to do with a new method for producing a filament of viscose possessing light-reflecting properties differing from those ordinarily produced.

One object of this invention is to incorporate with the solution a salt which will produce such an effect on the light-reflecting qualities of the formed filaments that they will appear to be of a duller luster than ordinary artificial filaments.

Another object of this invention is to produce a viscose solution which will result in filaments possessing a sheen or lustre resembling that of real silk.

Other objects will become apparent from a study of the following specification.

When cellulose is impregnated with a mercerizing solution of caustic soda, and carbon bisulphide is then added, a water-soluble sodium salt of cellulose xanthogenic acid is produced. This salt is called viscose and may be readily decomposed with the formation of gelatinized cellulose.

Theoretically, during the viscose reaction, sodium cellulose xanthogenate is formed as follows:

$$(C_6H_{10}O_5)_x + xNaOH = (C_6H_9O_4.ONa)_x + xH_2O$$

$$(C_6H_9O_4.ONa) + CS_2 = C_6H_9O_4.O.CS.SNa$$

The viscose solution decomposes spontaneously on standing, with the setting free of gelatinized cellulose.

In "ripening" there is first a progressive decrease in viscosity, owing to the depolymerizing action of the excess of alkali, then an increase in viscosity as coagulation sets in.

This solution, when the proper ripening stage is reached, is then spun or extruded in the form of fine filaments into a setting bath containing, usually, acids and sulphates.

My new invention has to do with a viscose spinning solution which contains certain amounts of salts of xanthogenic acid or derivatives of this acid, or homologues of the same.

The general type formula for this acid may be indicated by the formula:

where M is a metal and R is an alkyl or aryl radical (Cellulose excluded).

For example, the calcium salt of dithio-carbonic acid-o-isobutyl ester of the general formula:

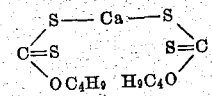

may be formed during the mercerization and it may be added directly to the solution prior to spinning.

As a second example, I may form a salt which might be termed the dithio-carbonic acid starch ester, possessing the general formula:

Besides calcium salts, those of barium and strontium may also be used.

As an example, between 5% and 10% of starch has been employed in making this starch ester, the quantity of starch being calculated on the weight of cellulose in the solution, for example, viscose. This starch compound may be prepared by treating the quantity of starch with an 18% aqueous solution of sodium hydroxide. The excess sodium hydroxide is pressed out, and the mass treated for 1 or 2 hours with carbon bisulphide (about 30% to 40% by weight of the starch).

This starch xanthate may either be added to the alkali cellulose in the shredder or placed directly in the mixer.

This example is given with respect to the viscose process.

These compounds thus formed should be soluble in the viscous solution.

They are decomposed during the spinning process in the same manner as the cellulose exanthate.

Depending upon the metal "M" which has been used, soluble or insoluble metallic salts are formed in the filaments, film, etc.

The nature of the radical "R" controls the fact as to whether or not organic compounds are formed in the filament, film, etc., which upon evaporation, might produce bubbles. These bubbles, if so produced, would have the effect of reflecting the light in such a way as to produce duller lustre.

Having now set forth my invention as required by the Patent Statutes, what I desire to claim is:

1. A viscose solution containing a dithio-carbonic acid starch ester.
2. A viscose solution containing a metal salt of a dithio-carbonic acid starch ester.
3. A viscose solution containing a calcium salt of a dithio-carbonic acid starch ester.
4. A viscose solution containing a barium salt of a dithio-carbonic acid starch ester.

RICHARD ELSSNER.

CERTIFICATE OF CORRECTION.

Patent No. 2,000,887.                                                                 May 7, 1935.

RICHARD ELSSNER.

It is hereby certified that the above numbered patent was erroneously issued to "North American Rayon Corporation, a corporation of New York," whereas said patent should have been issued to North American Rayon Corporation, a corporation of Delaware, as shown by the records of assignments in this office; and that the said Letters Patent should be read with this correction therein that the same may conform to the record of the case in the Patent Office.

Signed and sealed this 11th day of June, A. D. 1935.

(Seal)

Leslie Frazer
Acting Commissioner of Patents.